(12) United States Patent
Haddy

(10) Patent No.: US 8,878,648 B2
(45) Date of Patent: Nov. 4, 2014

(54) GENERATION OF BUFFER ZONES FOR BURIED ASSETS

(71) Applicant: Alan Haddy, Naples, FL (US)

(72) Inventor: Alan Haddy, Naples, FL (US)

( * ) Notice: Subject to any disclaimer, the term of this patent is extended or adjusted under 35 U.S.C. 154(b) by 0 days.

(21) Appl. No.: 14/303,772

(22) Filed: Jun. 13, 2014

(65) Prior Publication Data
US 2014/0292486 A1    Oct. 2, 2014

Related U.S. Application Data

(63) Continuation-in-part of application No. 14/060,301, filed on Oct. 22, 2013, now Pat. No. 8,823,492, which is a continuation-in-part of application No. 13/745,846, filed on Jan. 20, 2013, which is a continuation-in-part of application No. 13/543,612, filed on Jul. 6, 2012, now Pat. No. 8,358,201.

(51) Int. Cl.
*G08B 5/22* (2006.01)
*G08C 17/02* (2006.01)

(52) U.S. Cl.
CPC .................................. *G08C 17/02* (2013.01)
USPC ....... 340/8.1; 702/130; 455/456.1; 455/456.6

(58) Field of Classification Search
CPC ............ G08B 5/22; G01K 1/00; H04W 24/00
USPC ............... 340/8.1; 702/130; 455/451.6–456.6
See application file for complete search history.

(56) References Cited

U.S. PATENT DOCUMENTS

2011/0191058 A1*  8/2011  Nielsen et al. ................ 702/130

* cited by examiner

*Primary Examiner* — Steven Lim
*Assistant Examiner* — Kaleria Knox
(74) *Attorney, Agent, or Firm* — Mark Terry

(57) ABSTRACT

A method on a computing device for defining a buffer zone around a buried asset at an above-surface location is provided that solves the above-described problems. The method includes receiving and storing buried asset data points, wherein each buried asset data point comprises a geographical coordinate and a precision data value corresponding to the geographical coordinate, for a buried asset, wherein the buried asset data points correspond to signals that were detected and read from the buried asset at the above-surface location. The method further includes generating a two dimensional area comprising a buffer zone by defining circles around geographical coordinates of the buried asset data points, wherein a size of each circle is based on the precision data value of the corresponding buried asset data point, and defining trapezoids that connect adjacent circles.

19 Claims, 13 Drawing Sheets

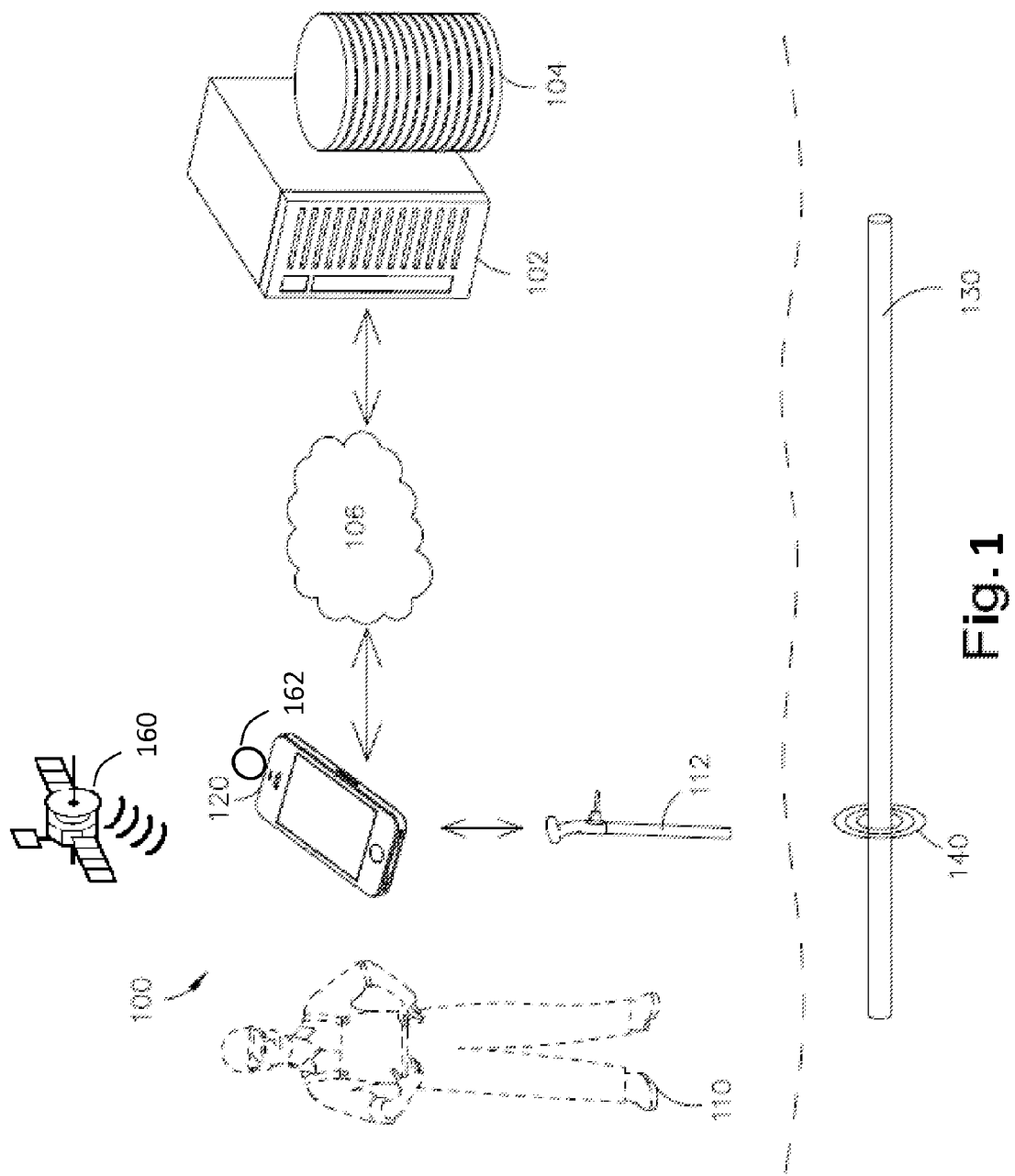

GENERATION OF BUFFER ZONES FOR BURIED ASSETS

CROSS-REFERENCE TO RELATED APPLICATIONS

This patent application is a continuation in part of, and claims priority to, patent application Ser. No. 14/060,301 filed Oct. 22, 2013 and entitled "Detection of Incursion of Proposed Excavation Zones Into Buried Assets," which is a continuation in part of patent application Ser. No. 13/745,846 filed Jan. 20, 2013 and entitled "Storage and Recall of Buried Asset Data Over Communications Networks for Damage Avoidance and Mapping," which is a continuation of patent application Ser. No. 13/543,612 filed Jul. 6, 2012 and entitled "Storage and Recall of Buried Asset Data Over Communications Networks for Damage Avoidance and Mapping." The subject matter of patent application Ser. Nos. 14/060,301, 13/543,612 and 13/745,846 are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the detection and identification of buried assets (i.e., underground utility lines) and, more specifically, to processes for generating buffer zones around buried assets.

BACKGROUND

Utility lines, such as lines for telephones, electricity distribution, natural gas, cable television, fiber optics, Internet, traffic lights, street lights, storm drains, water mains, and wastewater pipes, are often located underground. Utility lines are referred to as "buried assets" herein. Consequently, before excavation occurs in an area, especially an urban area, an excavator is typically required to clear excavation activities with the proper authorities. The clearance procedure usually requires that the excavator contact a central authority (such as "One Call", "811" and "Call Before You Dig," which are well known in the art) which, in turn, sends a notification to the appropriate utility companies. Subsequently, each utility company must perform a buried asset detection procedure, which includes having a field technician visit the proposed excavation site, so as to detect the relevant buried assets and physically mark the position of the buried asset using temporary paint or flags. Usually, a technician visiting a proposed excavation site utilizes a device known as a conventional locator—a commercial, off-the-shelf, utility locator that detects and identifies buried assets using radio frequency and/or magnetic sensors. Upon completion of this procedure by the appropriate utility companies, excavation can occur with the security that buried assets will not be damaged.

During the excavation process, excavators must have accurate information regarding the location of buried assets, so as to avoid incursions into the buried assets with heavy equipment. When utility lines are inadvertently cut during excavation, the result can be disastrous and very costly. As such, in areas where space is at a minimum, such as dense urban areas, the accuracy of the position data of the buried assets becomes even more important. Excavators base their decisions regarding how and where to excavate, on the buried asset position data. Today, however, there is little data provided about buried assets, other than paint markers on the ground, or flags placed at various points along the route of the buried asset. Excavators make excavation decisions based on this scant data, which leaves much to be desired.

Furthermore, utility companies are faced with increasing requests to locate and mark the position of their buried assets to avoid damage from third party excavators, contractors and underground horizontal boring operations. When a utility company receives a notification from the central authority, the utility company must decide whether to: a) dispatch a field technician to physically locate and mark out the buried asset, or b) respond back to the central authority that the utility company is "not involved" and close the ticket, which normally occurs when the proposed excavation area is not within the proximity of a buried asset. Utility companies can lose considerable time and substantial capital by unnecessarily dispatching field technicians to perform locates and mark outs when the proposed excavation area is not within the proximity of a buried asset. These false dispatches can be due to inaccurate map records or unknown buried asset position relative to the proposed excavation or boring zone.

Therefore, a need exists for improvements over the prior art, and more particularly for more efficient methods and systems for logging the location of buried assets and for determining when a site visit by a field technician is required, with respect to a proposed excavation site.

SUMMARY

A method on a computing device for defining a buffer zone around a buried asset at an above-surface location is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a method on a computing device for defining a buffer zone around a buried asset at an above-surface location is provided that solves the above-described problems. The method includes receiving and storing a plurality of buried asset data points, wherein each buried asset data point comprises a geographical coordinate and a precision data value corresponding to the geographical coordinate, for a buried asset, wherein the plurality of buried asset data points correspond to analog radio frequency signals that were detected and read from the buried asset at the above-surface location. The method further includes generating, by the processor, a first data structure that represents a two dimensional area comprising a buffer zone at the above-surface location, wherein the first data structure is generated by: (a) defining, by the processor, a first circle around a geographical coordinate of a buried asset data point and a second circle around a geographical coordinate of an adjacent buried asset data point of the plurality of buried asset data points, and wherein a size of each circle is based on the precision data value of the corresponding buried asset data point; (b) defining, by the processor, a trapezoid, wherein a first side of the trapezoid is a line that bisects the first circle and wherein a second side of the trapezoid is a line that bisects the second circle; and (c)

repeating, by the processor, steps (a) and (b) for each adjacent pair of buried asset data points, and wherein a combination of the circles and trapezoids generated comprise the two dimensional area of the first data structure.

In another embodiment, the method further includes receiving a second data structure that represents a two dimensional area comprising an excavation zone at the above-surface location, calculating whether the two dimensional area of the first data structure intersects with the two dimensional area of the second data structure, and transmitting a request for a locate procedure to a user via a communications network communicatively coupled with the computing device, if the two dimensional area of the first data structure intersects with the two dimensional area of the second data structure.

BRIEF DESCRIPTION OF THE DRAWINGS

The accompanying drawings, which are incorporated in and constitute a part of this disclosure, illustrate various example embodiments. In the drawings:

FIG. 1 is a diagram of an operating environment that supports a process on a server for defining a buffer zone around a buried asset and comparing the buffer zone to a proposed excavation zone, according to an example embodiment;

DETAILED DESCRIPTION

Figure 2A:
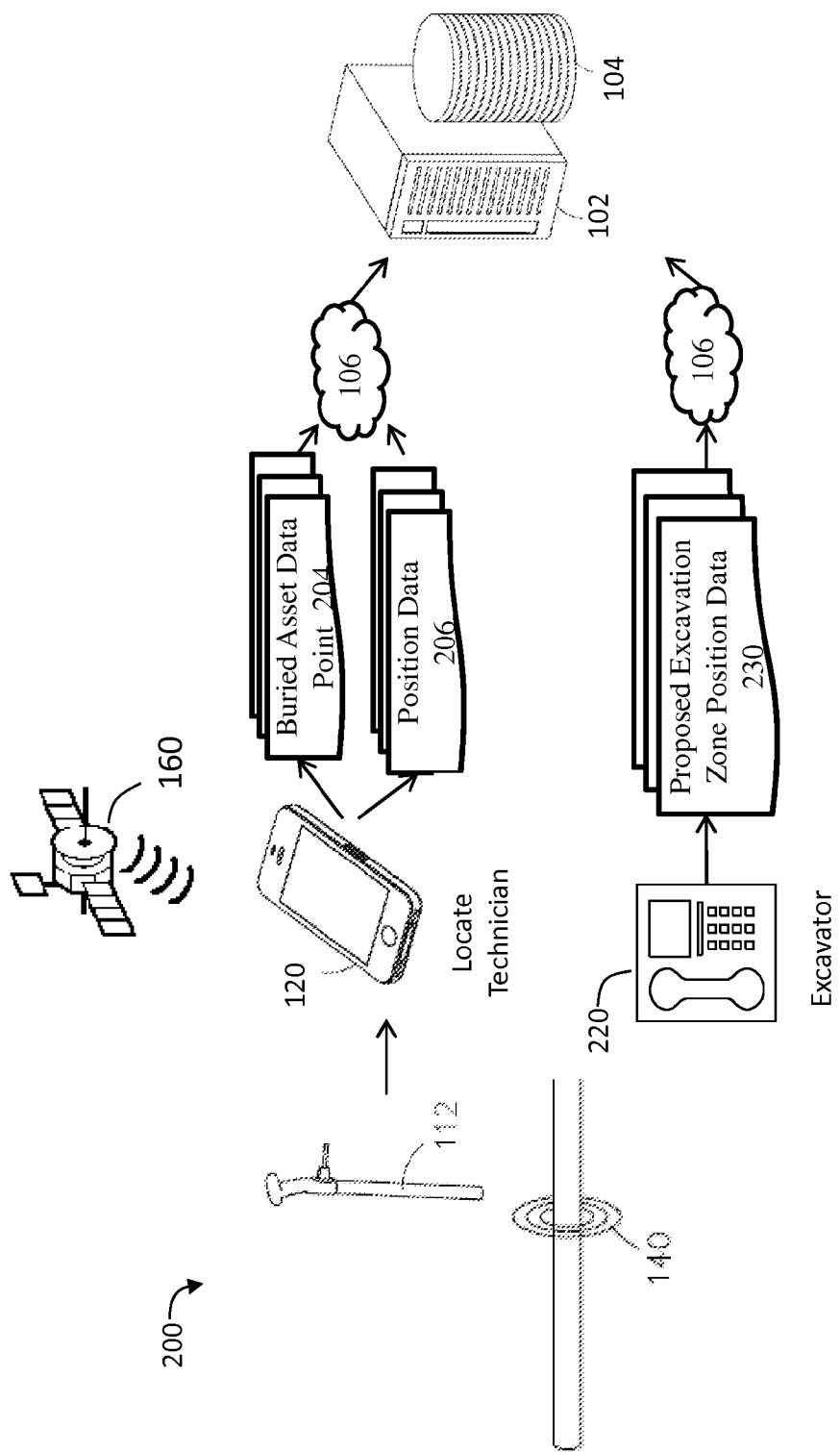
FIG. 2A is a diagram showing the data flow of the general process for defining a buffer zone around a buried asset and comparing the buffer zone to a proposed excavation zone, according to an example embodiment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

The present invention improves over the prior art by providing a more accurate definition of a buffer zone around a buried asset, so as to provide better data for a field technician during excavation. The example embodiments automatically create a virtual two-dimensional or three-dimensional buffer zone around a buried asset, which is more accurate (since it takes the precision data value of buried asset data points into account) and can thereby be used by a field technician while excavating. The example embodiments reduce or eliminate the number of disastrous and costly incursions into buried assets and increase the quality of excavation activities. This decreases operating costs associated with buried assets, for utility companies.

The present invention also improves over the prior art by providing a more efficient way of determining when a site visit by a field technician (i.e., a dispatch) is required, with respect to a proposed excavation site. The example embodiments automatically create a virtual two-dimensional or three-dimensional buffer zone around a buried asset, which can be compared to a proposed excavation zone to determine whether the two overlap, thereby necessitating a site visit by a field technician. The example embodiments reduce the number of false dispatches by enabling electronic analysis, evaluation and comparison of a proposed excavation zone with a buffer zone that has been created around a buried asset's location. A utility company, for example, may automatically and accurately filter incoming locate ticket requests, thus reducing unnecessary field technician dispatches. This decreases the costs associated with buried asset detection in relation to the central authority.

FIG. 1 is a diagram of an operating environment 100 that supports a process on a server 102 for defining a buffer zone around a buried asset and comparing the buffer zone to a proposed excavation zone. The server 102 may be communicatively coupled with a communications network 106, according to an example embodiment. The environment 100 may comprise a mobile computing device 120, which may communicate with server 102 via a communications network 106. Mobile computing device 120 may comprise a cellular telephone, smart phone or tablet computer. Device 120 may also comprise other computing devices such as desktop computers, laptops, and game consoles, for example. The mobile computing device 120 may be connected either wirelessly or in a wired or fiber optic form to the communications network 106. Communications network 106 may be a packet switched network, such as the Internet, or any local area network, wide area network, enterprise private network, cellular network, phone network, mobile communications network, or any combination of the above.

The environment 100 shows that mobile computing device 120 is operated by a technician 110 (i.e., a field technician) and includes an antenna array 112, which may be communicatively coupled, either wirelessly or in a wired or fiber optic form, to the mobile computing device 120. As such, server 102, and devices 120 and 112 may each comprise a computing device 1100, described below in greater detail with respect to FIG. 11. FIG. 1 shows that antenna array 112 detects radio frequency and/or magnetic signals 140 emanating from a buried asset 130.

In another embodiment, the device 120 also calculates its current position and transmits it to the server 102 over network 106. In one embodiment, the device 120 calculates its current position using a Global Positioning System (GPS) receiver, which is a navigation device that receives GPS signals for the purpose of determining the device's current position on Earth. A GPS receiver, and its accompanying processor, may calculate latitude, longitude and altitude information. In this embodiment, a radio frequency signal is received from a GPS transmitter (such as a satellite) comprising a time the signal was transmitted and a position of the transmitter. Subsequently, the device 120 calculates current position data of the device 120 based on the signal, and transmits the current position data to the server 102 via the communications network 106. In another embodiment, the device 120 calculates its current position using alternative services, such as control plan locating, GSM localization, dead reckoning, or any combination of the aforementioned position services. In yet another embodiment, the device 120 also calculates its current compass heading (such as via the use of a compass application) and transmits this data to the server 102 over network 106. In yet another embodiment, the device 120 and/or array 112 receives data from a satellite 160 (or multiple satellites), such as a Global Positioning System (GPS) satellite, and calculates position data based on the data received.

In one embodiment, FIG. 1 shows that device 120 includes a peripheral 162, which may be a high accuracy or high precision GPS module that provides positional data of greater accuracy to device 120. In addition to satellite(s) 160, peripheral 120 may collect data from other sources, such as land-based position data providers that broadcast position data over radio frequency, or additional constellations of satellites. Alternatively, in lieu of device 120, array 112 and peripheral 162, the technician 110 may utilize a single, integrated locator device that detects and identifies buried assets using radio frequency and/or magnetic sensors, and which further performs the functions of device 120, array 112 and peripheral 162, as described herein.

Server 102 includes a software engine that delivers applications, data, program code and other information to networked device 120. The software engine of server 102 may perform other processes such as transferring multimedia data in a stream of packets that are interpreted and rendered by a software application as the packets arrive. FIG. 1 further shows that server 102 includes a database or repository 104, which may be a relational database comprising a Structured Query Language (SQL) database stored in a SQL server. Mobile computing device 120 may also each include databases. The database 104 may serve buried asset data, as well as related information, which may be used by server 102 and mobile computing device 120.

Server 102, mobile computing device 120 and antenna array 112 may each include program logic comprising computer source code, scripting language code or interpreted language code that perform various functions of the present invention. In one embodiment, the aforementioned program logic may comprise program module 1107 in FIG. 11. It should be noted that although FIG. 1 shows only one mobile computing device 120 and one server 102, the system of the present invention supports any number of servers and mobile computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

Environment 100 may be used when a mobile computing device 120 engages in buried asset detection activities that comprise reading, generating, and storing buried asset data in database 104 coupled to server 102. Various types of data may be stored in the database 104 of server 102 with relation to a buried asset that has been detected and located. For example, the database 104 may store one or more records for each buried asset, and each record may include one or more buried asset data points. A buried asset data point may include a current time, a textual map address, and location data or position data, such as latitude and longitude coordinates, geographical coordinates, an altitude coordinate, or the like. A buried asset data point may also include depth measurement data, electrical signal measurement data (such as electrical current measurement data, resistance measurement data, impedance measurement data, electrical signal magnitude measurement data, electrical signal frequency measurement data, electrical signal voltage measurement data, etc.), direction data and orientation data.

A buried asset data point may also include a precision data value corresponding to any piece of information associated with a buried asset data point, such as the geographical coordinate. A precision data value is a value that represents the quality or level of precision of a piece of information, such as a geographical coordinate. All sensors and devices that read physical quantities have a certain amount of measurement error or observational error. A precision data value represents the amount or magnitude of the measurement error or observational error of a sensor or device at one time. In one embodiment, a precision data value is a numerical value, such as an integer, or a real number within a given range. For example, the precision data value may be a real number from 0 to 1.0 (with a variable number of decimal points) wherein zero represents perfect precision, 0.5 represents a precision that is 50% off from a true value, 0.75 represents a precision that is 75% off from a true value, etc. In another embodiment, a precision data value is an alphanumeric value (such as a word or other ASCII string) that corresponds (according to a lookup table or other correspondence table) to a predefined amount of precision. Examples of alphanumeric words that reflect the precision of a data value includes "high", "medium" and "low." In another embodiment, a precision data value is any set of values that may be sorted according to ascending or descending value. Thus, in this embodiment, precision data values may have ascending and descending values.

In one embodiment, the precision data value is inversely proportional to the level of precision of quality of a piece of information, such as a geographical coordinate. Thus, when there is a large margin of error or a low confidence level in a piece of information, then the precision data value is high and the quality or level of precision of the information is low. Conversely, when there is a small margin of error or a high confidence level in a piece of information, then the precision data value is low and the quality or level of precision of the information is high. In another embodiment, the precision data value is directly proportional to the level of precision of quality of a piece of information.

With regard to geographical coordinates, HDOP, VDOP, PDOP, and TDOP values (Horizontal, Vertical, Positional and Time Dilution of Precision, respectively) are values well known in the art for representing the quality or level of precision of a geographical coordinate. Thus, in one embodiment, HDOP, VDOP, PDOP, and/or TDOP values are used to generate a precision data value for a geographical coordinate. Also with regard to geographical coordinates, values representing the quality or level of precision of a geographical coordinate may rely on whether a differential correction technique (such as differential GPS) was used in calculating the coordinate. The Differential Global Positioning System (DGPS) is an enhancement to Global Positioning System that provides improved location accuracy. DGPS uses a network of fixed, ground-based reference stations to broadcast the difference between the positions indicated by the satellite systems and the known fixed positions. As such, if DGPS was used to calculate a geographical coordinate, then the precision data value of the coordinate may reflect that fact. For example, the precision data value may indicate higher accuracy if DGPS was used.

Similarly, a buried asset data point may also include a precision data value corresponding to any piece of information associated with a buried asset data point, such as a current time, a textual map address, depth measurement data, electrical signal measurement data (such as electrical current measurement data, signal strength data, resistance measurement data, impedance measurement data, electrical signal magnitude measurement data, electrical signal frequency measurement data, electrical signal voltage measurement data, electromagnetic vector data, etc.), direction data (left or right indicators that direct the technician to the location of the buried asset), orientation data, and location data or position data, such as latitude and longitude coordinates, geographical coordinates, an altitude coordinate, or the like. Thus, any of the above value that are included in a buried asset data point may have a separate precision data value associated with it.

A buried asset data point may further include one or more images (i.e., photographs) of the physical area of the location. In one embodiment, an image of a physical area corresponding to a location comprises one or more surface markings indicating a position of the one or more buried assets. Markings may include colored or uncolored solid lines, dotted lines, circles, squares, flags, arrows, objects, text or other visual indicia in the image that indicate the actual location of a buried asset. A solid yellow line, for example, may be used in an image of a physical area corresponding to a location in order to indicate the presence of a buried asset in the actual location of the solid yellow line. Lastly, a buried asset data point may include other data, such as the name or unique identifier for the technician that created the record, a time/date stamp indicating a creation and/or modification date of the location record, etc.

Figure 2B:
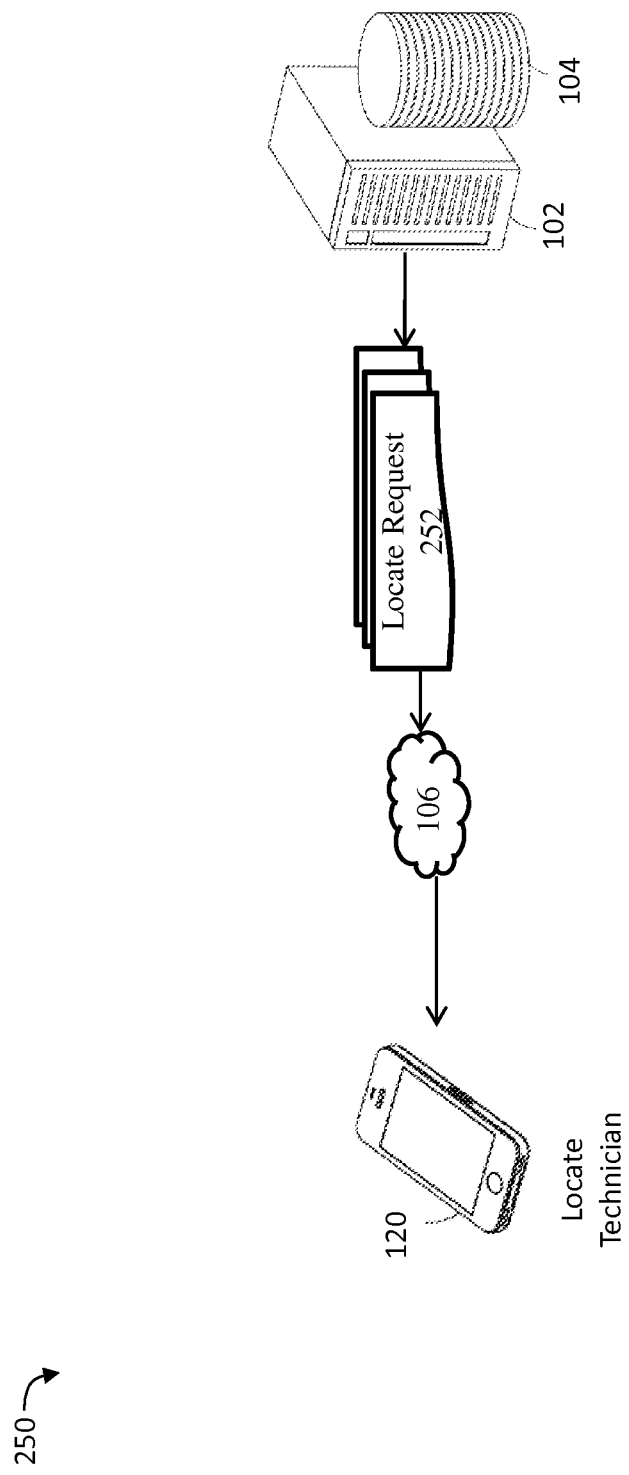
FIG. 2B is a diagram showing the data flow of a process for ordering an on-site visit by a field technician over a communications network, according to an example embodiment.
Figure 3:
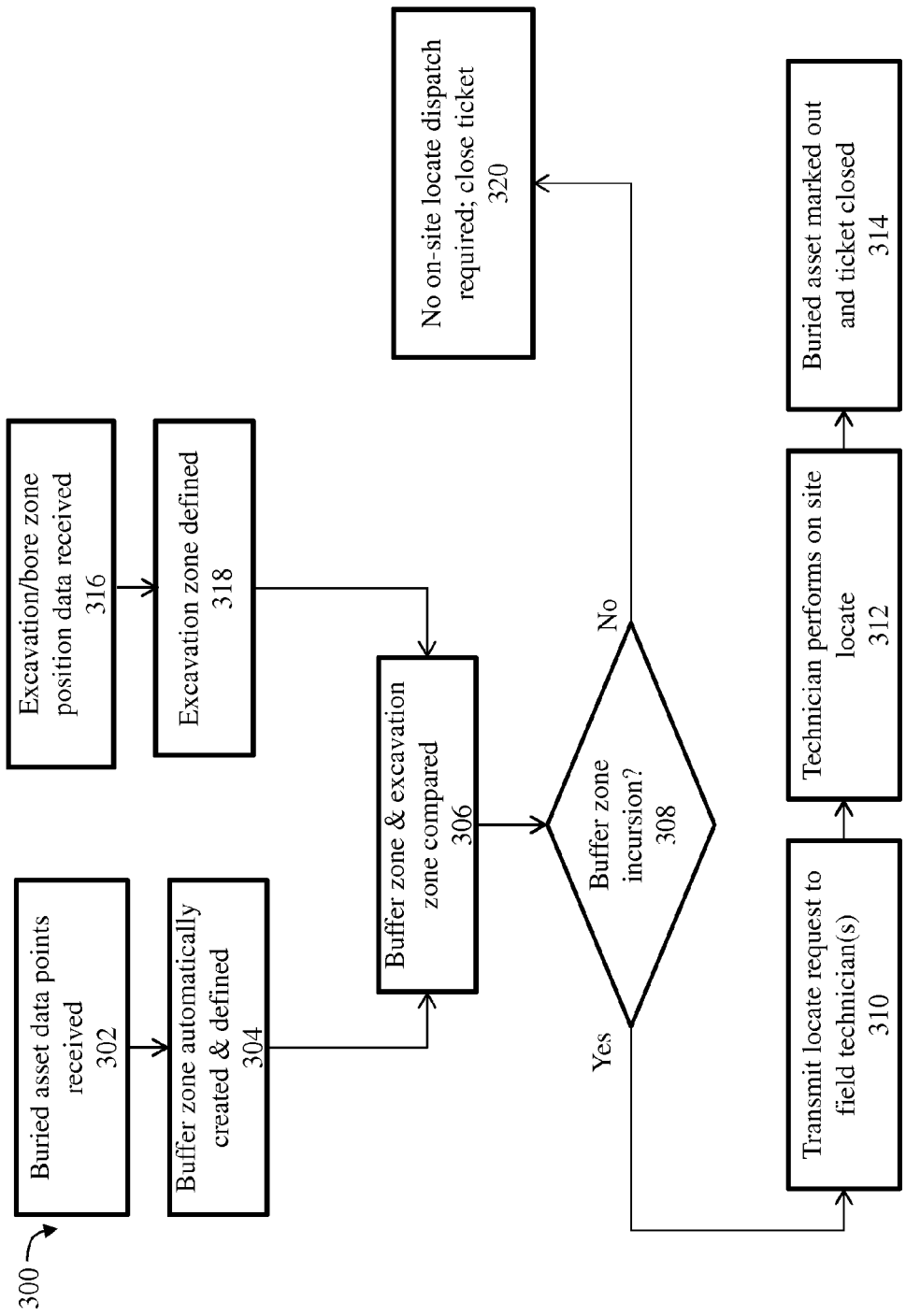
FIG. 3 is a flow chart showing the control flow of the process for defining a buffer zone around a buried asset and comparing the buffer zone to a proposed excavation zone, according to an example embodiment.

FIG. 3 is a flow chart showing the control flow of the process 300 for defining a buffer zone around a buried asset and comparing the buffer zone to a proposed excavation zone, according to an example embodiment. Process 300 describes the steps that occur when the server 102 automatically creates a virtual two-dimensional or three-dimensional buffer zone around a buried asset, which is later compared to a proposed excavation zone to determine whether the two overlap. The process 300 is described with reference to FIGS. 2A and 2B, which shows the general data flow 200, 250 of the process 300.

Process 300 starts with step 302 wherein a locate technician 110 visits an above-ground location. The device 120 utilizes the antenna array 112 to read raw analog signals 140 emanating from a buried asset 130, and calculates additional information, such as position data based on data it has received from the satellite(s) 160. Based on the data it has received and calculated, device 120 calculates one or more buried asset data points 204, wherein each buried asset data point comprises, for example, a geographical coordinate and a precision data value corresponding to the geographical coordinate, for a buried asset. A buried asset data point may further comprise depth measurement data, and electrical current measurement data. The device 120 uploads the buried asset data points 204 to the server 102 via the network 106.

In step 304, the server 102 automatically creates a two-dimensional or three-dimensional buffer zone around the buried asset data points 204, as defined more fully below, with reference to FIGS. 4A through 4F. A buffer zone is any data or data set that defines an area, location, place, solid or perimeter where a buried asset is located. Inherent in a buffer zone is the characteristic that two zones or areas are being separated.

Parallel to steps 302, 304, in step 316, an excavator 220 sends to server 102 the position data 230 for a proposed excavation zone. The position data may take a variety of forms, including a set of geographical coordinates, a definition of a two-dimensional surface, a definition of a three-dimensional solid, any set of position data that defines a two or three-dimensional area, etc. In step 318, the server 102 automatically creates a two-dimensional or three-dimensional excavation zone 230, as defined more fully below.

In step 306, the buffer zone generated by the server 102 and the excavation zone generated by the server 102 are compared to determine whether there is an incursion of the excavation zone into the buffer zone (see FIGS. 5A-5B below). In one embodiment, collision detection techniques known in the art may be used to determine whether the two or three dimensional buffer zone intersects with the two or three dimensional excavation zone. The result of the outcome of step 306 is stored in memory of server 102 and/or in the database 104 as a data element that indicates whether the two or three dimensional buffer zone intersects with the two or three dimensional excavation zone. In step 308, if there is an incursion, then control flows to step 310. If there is no incursion, then control flows to step 320. In step 320, since there is no incursion, there is no need for a locate technician to be dispatched to the excavation site and the ticket is closed. The outcome shown in step 320 illustrates an instance wherein a locate technician was not dispatched because it was not deemed necessary by step 308, thereby increasing efficiency.

In step 310, an incursion of the excavation zone into a buried asset has been detected, and therefore the server 102 transmits a locate request 252 to the device 120 of technician 110. The locate request may define the excavation zone and the buffer zone generated by the server 102 and may include a request to perform a locate procedure. In step 312, the technician 110 travels to the proposed excavation site and performs a locate procedure at the proposed excavation site, which includes (in step 314) marking out the location of the buried asset on the ground using, for example, temporary spray paint. Subsequently, the ticket is closed. The outcome of step 314 showcases how dispatches only occur when the chance of an excavation zone incursion into a buried asset is too high, as calculated by step 308, thereby reducing the number of false dispatches.

Figure 4A:
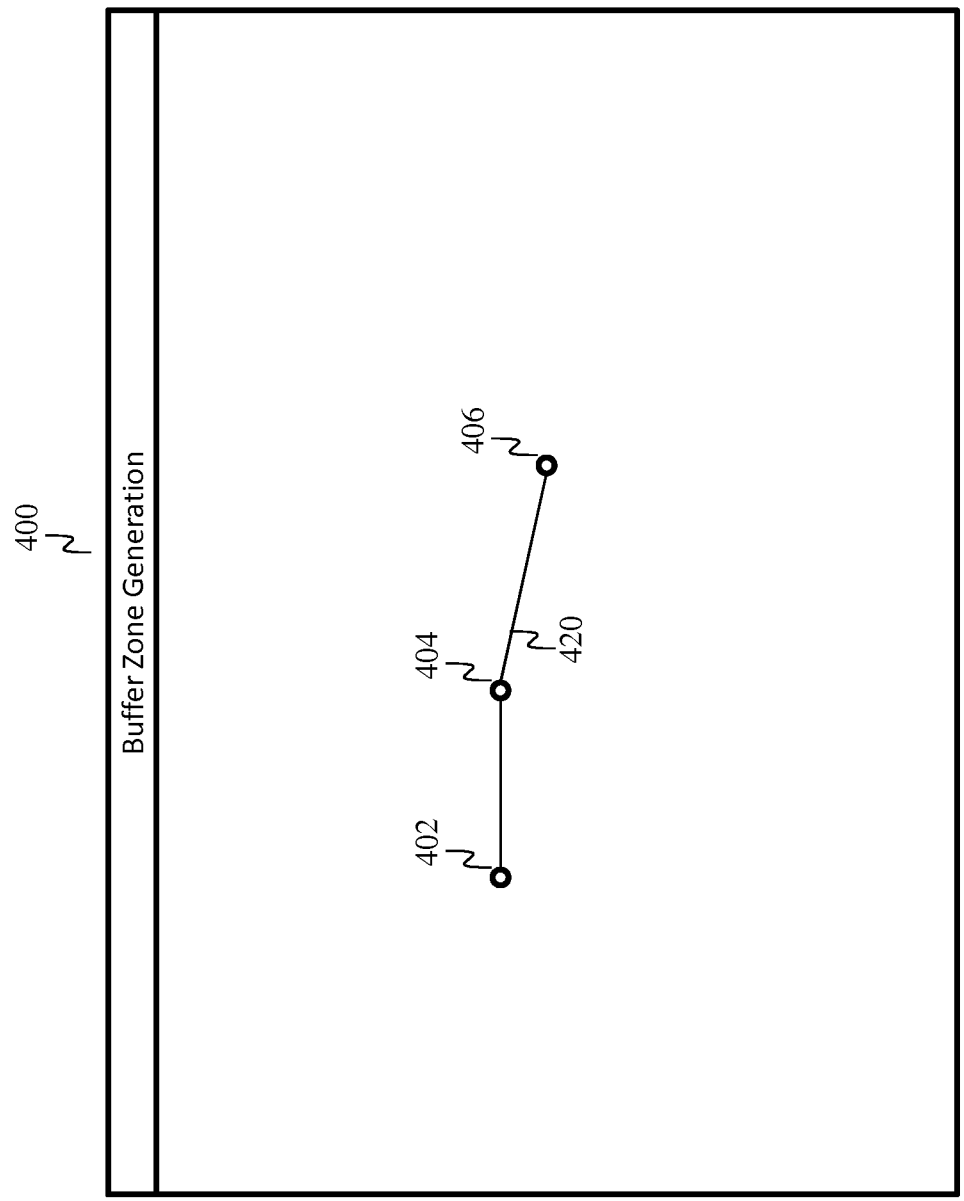
FIG. 4A is an illustration of a graphical user interface that shows buried asset data points connected via line segments, according to an example embodiment.
Figure 4B:
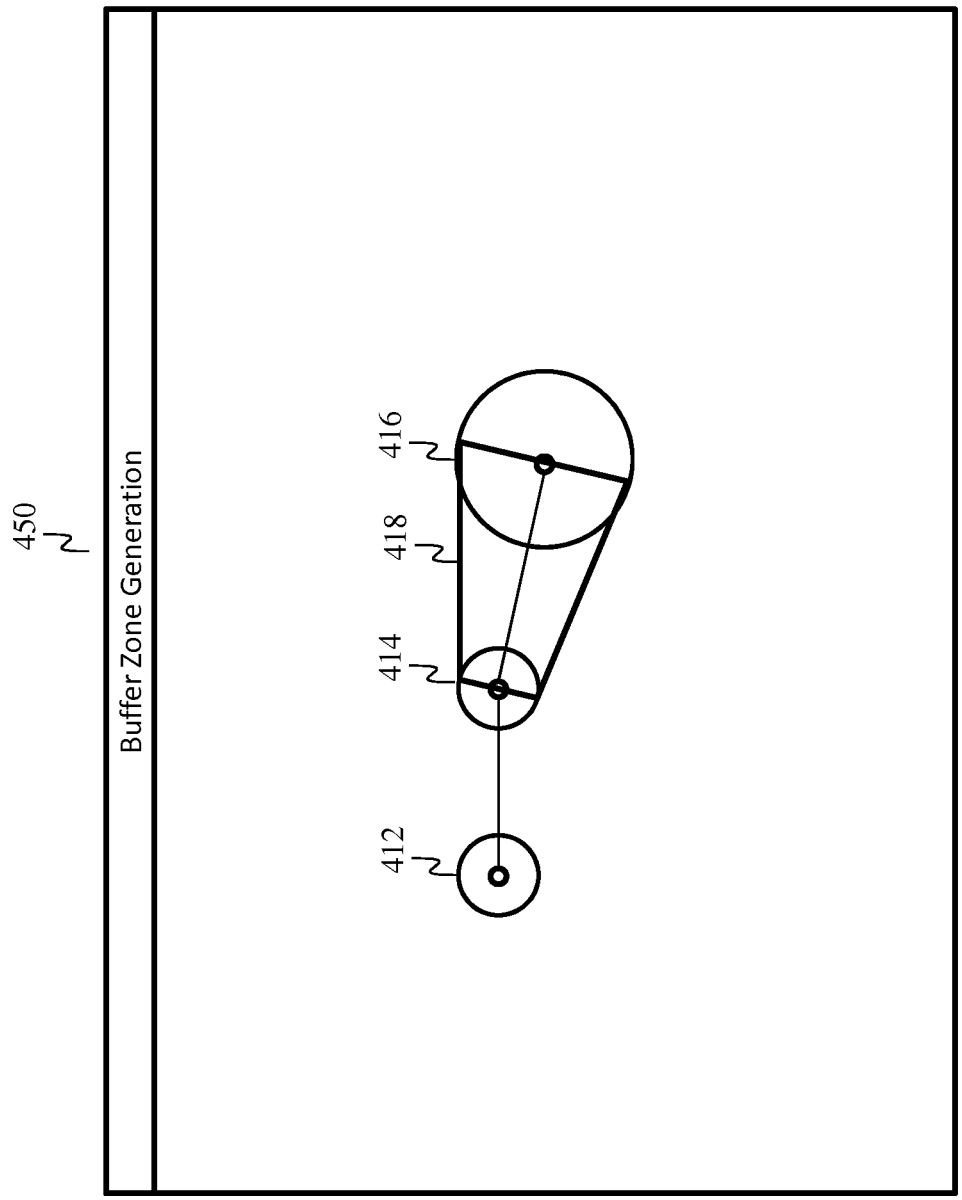
FIG. 4B is an illustration of a graphical user interface that shows buried asset data points surrounded by circles and trapezoids, according to an example embodiment.
Figure 4C:
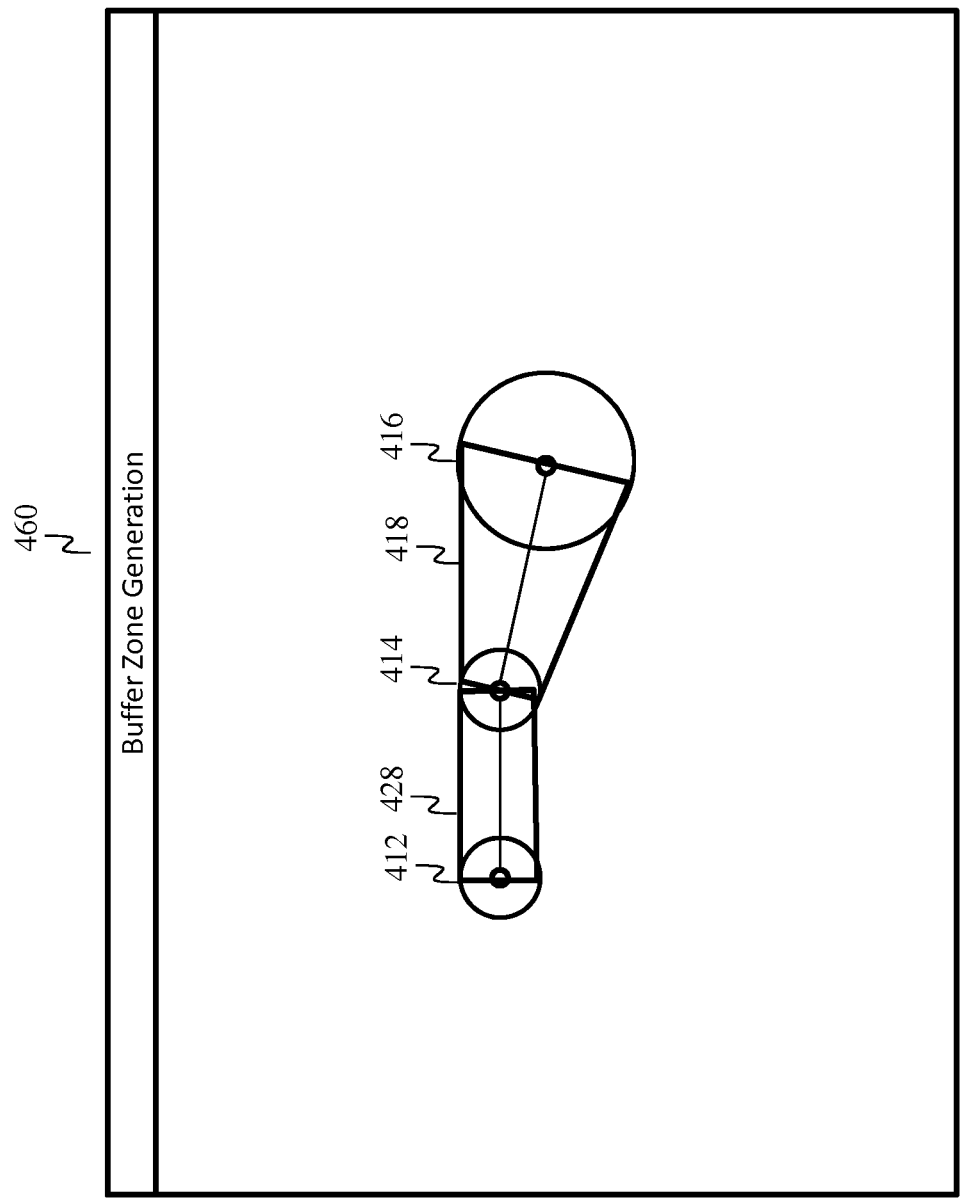
FIG. 4C is another illustration of a graphical user interface that shows buried asset data points surrounded by circles and trapezoids, according to an example embodiment.

FIGS. 4A through 4C depict illustrations of graphical user interfaces (GUI) that show how a two-dimensional buffer zone is generated using buried asset data points, according to an example embodiment. In FIG. 4A, the GUI 400 shows that three buried asset data points 402, 404, 406 are displayed according to their corresponding geographical coordinate data. The buried asset data points 402, 404, 406 are connected via straight line segments to form a central line 420 that represents an approximation of the location of the buried asset in between the buried asset data points 402, 404, 406.

GUI 450 of FIG. 4B shows that a two-dimensional circle has been created around the geographical coordinate of each buried asset data point. The size of each circle corresponds to the precision data value corresponding to the geographical coordinate of the buried asset data point. In one embodiment, the circle generated around each buried asset data point is generated as follows: 1) read the precision data value of the geographical coordinate of the buried asset data point, 2) generate a radius value that corresponds to the precision data value (such as by multiplying the precision data value by a constant that represents the desired size of the buffer), and 3) create a circle around the buried asset data point using the radius value as the radius measurement of the circle.

In one embodiment, the size of the circle created around a buried asset data point is larger when the precision data value reflects low precision and the circle is smaller when it reflects high precision. Thus, when the geographical coordinate of the buried asset data point has low precision (according to the precision data value), then the circle is larger. When the geographical coordinate of the buried asset data point has high precision (according to the precision data value), then the circle is smaller. Consequently, the circle 416 large because the geographical coordinate of the buried asset data point 406 has low precision. Further, the circles 412, 414 are small because the geographical coordinates of the buried asset data points 402, 404 have high precision.

GUI 450 of FIG. 4B further shows that the adjacent buried asset data points 404, 406 (and, by extension, the circles 414, 416) have been connected via a two-dimensional trapezoid 418. A trapezoid comprises a quadrilateral with at least one pair of parallel sides. Thus, a trapezoid may also be a quadrilateral with two pairs of parallel sides. In one embodiment, the trapezoid 418 that connects adjacent buried asset data points has a first side comprising a line that bisects the first circle 416, and a second side comprising a line that bisects the second circle 414. To bisect a circle refers to generating a straight line through a circle such that the line includes the center of the circle, thereby dividing the circle into two equal halves. In one alternative, the first side of the trapezoid 418 is parallel to the second side of the trapezoid, and the first and second sides are both perpendicular to a straight line between buried asset data points 404, 406. In another alternative, the first side of the trapezoid 418 is bound by the circle 416 and the second side of the trapezoid is bound by circle 414. A line is bound by a circle if the entire line is located within the circle.

In one embodiment, the trapezoid 418 that connects adjacent buried asset data points 404, 406 may be generated as follows: 1) generate a straight line between adjacent buried asset data points 404, 406, 2) generate a first side of the trapezoid by generating a line that bisects the first circle 416, and generate a second side of the trapezoid by generating a line that bisects the second circle 414 (wherein the first and second sides may be parallel, wherein the first and second sides may be perpendicular to a line connecting points 404, 406, wherein the first side may be bound by circle 416, and wherein the second side may be bound by circle 414), and 3) connect one end of the first side of the trapezoid with one end of the second side of the trapezoid with a straight line, and connect another end of the first side of the trapezoid with another end of the second side of the trapezoid with a straight line.

Subsequently, all adjacent buried asset data points are connected via a trapezoid, similarly to trapezoid 418. GUI 460 of FIG. 4C further shows that the adjacent buried asset data points 402, 404 (and, by extension, the circles 412, 414) have been connected via a trapezoid 428. The two-dimensional buffer zone comprises the union of all circles and trapezoids generated in GUIs 400-460 above.

Figure 4D:
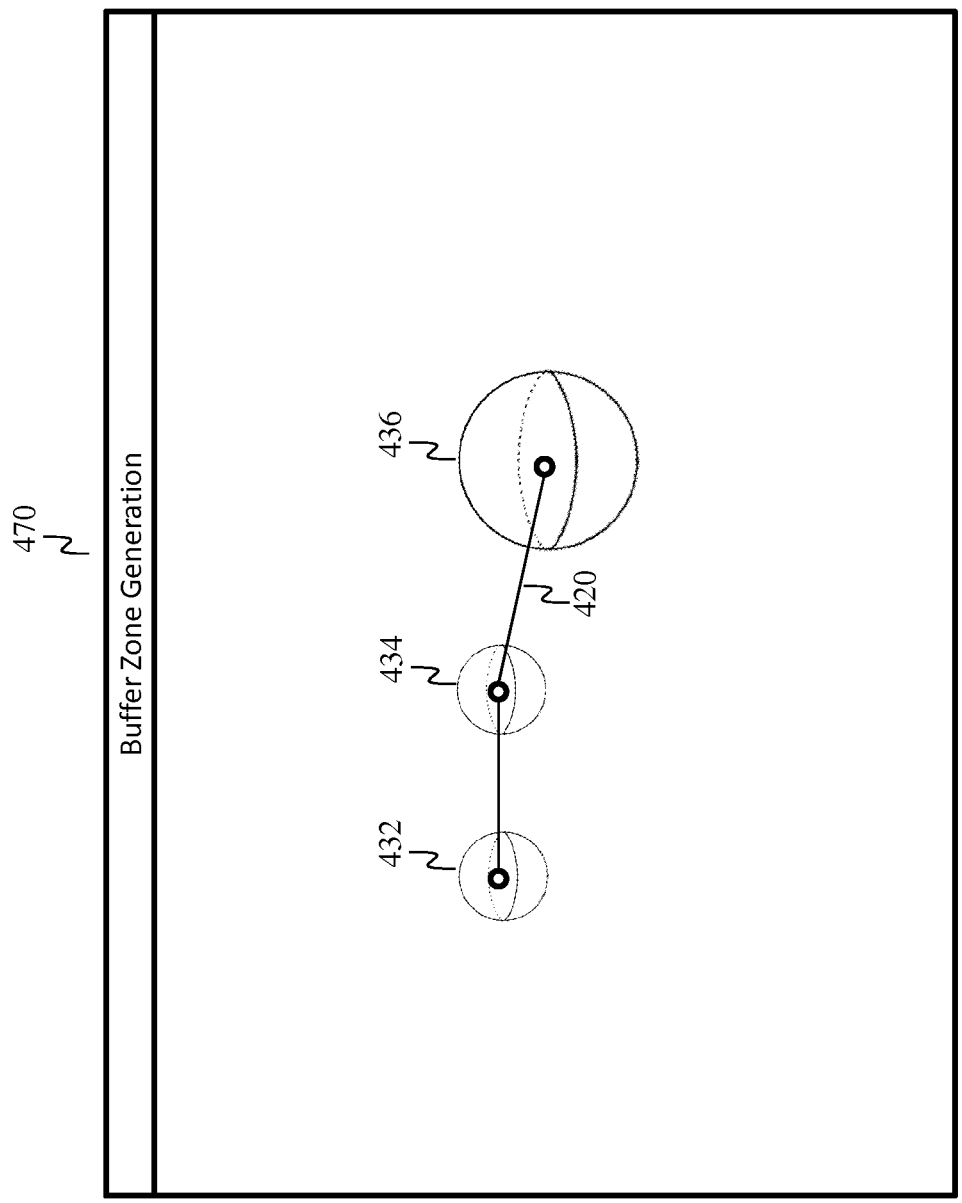
FIG. 4D is an illustration of a graphical user interface that shows buried asset data points surrounded by spheres, according to an example embodiment.
Figure 4E:
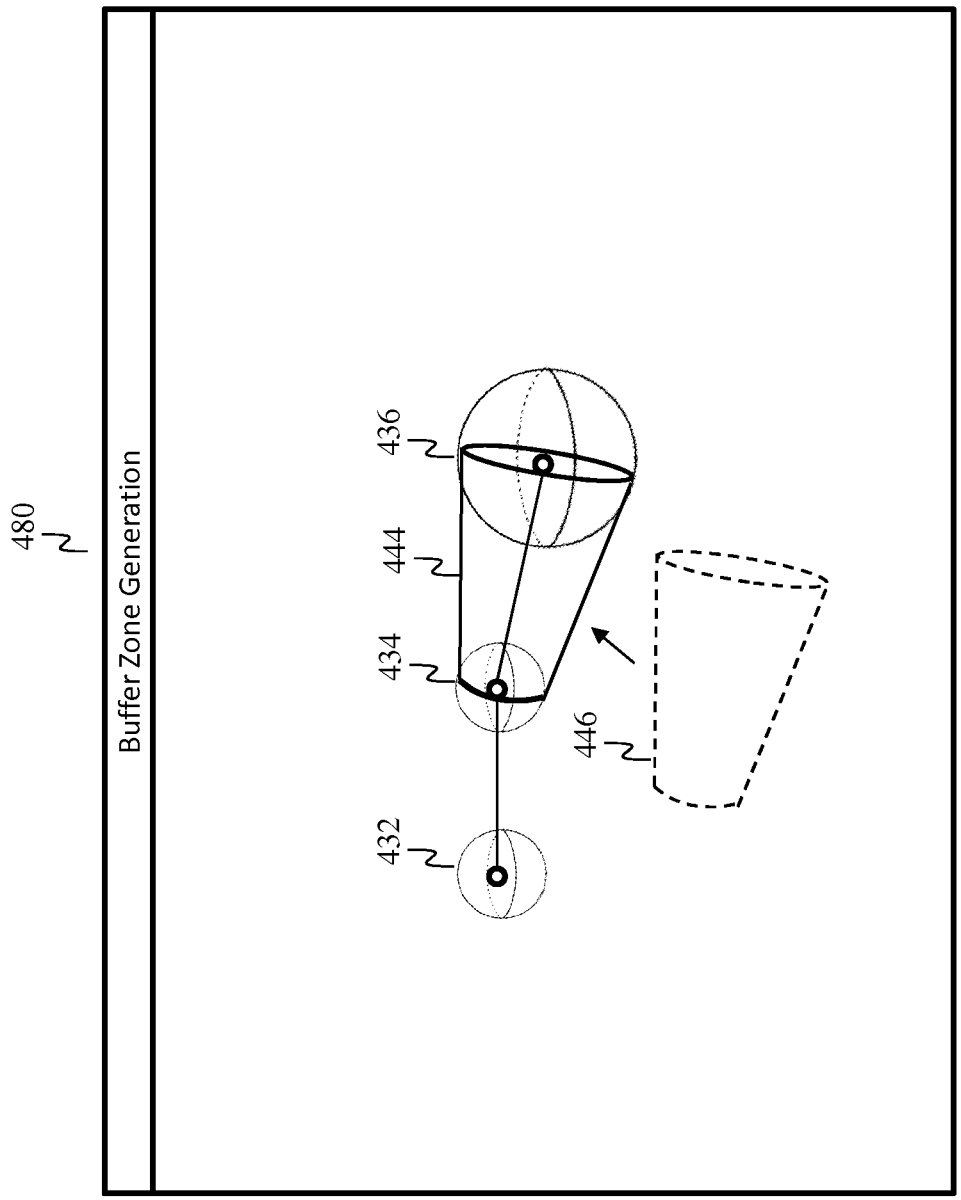
FIG. 4E is an illustration of a graphical user interface that shows buried asset data points surrounded by spheres and truncated cones, according to an example embodiment.
Figure 4F:
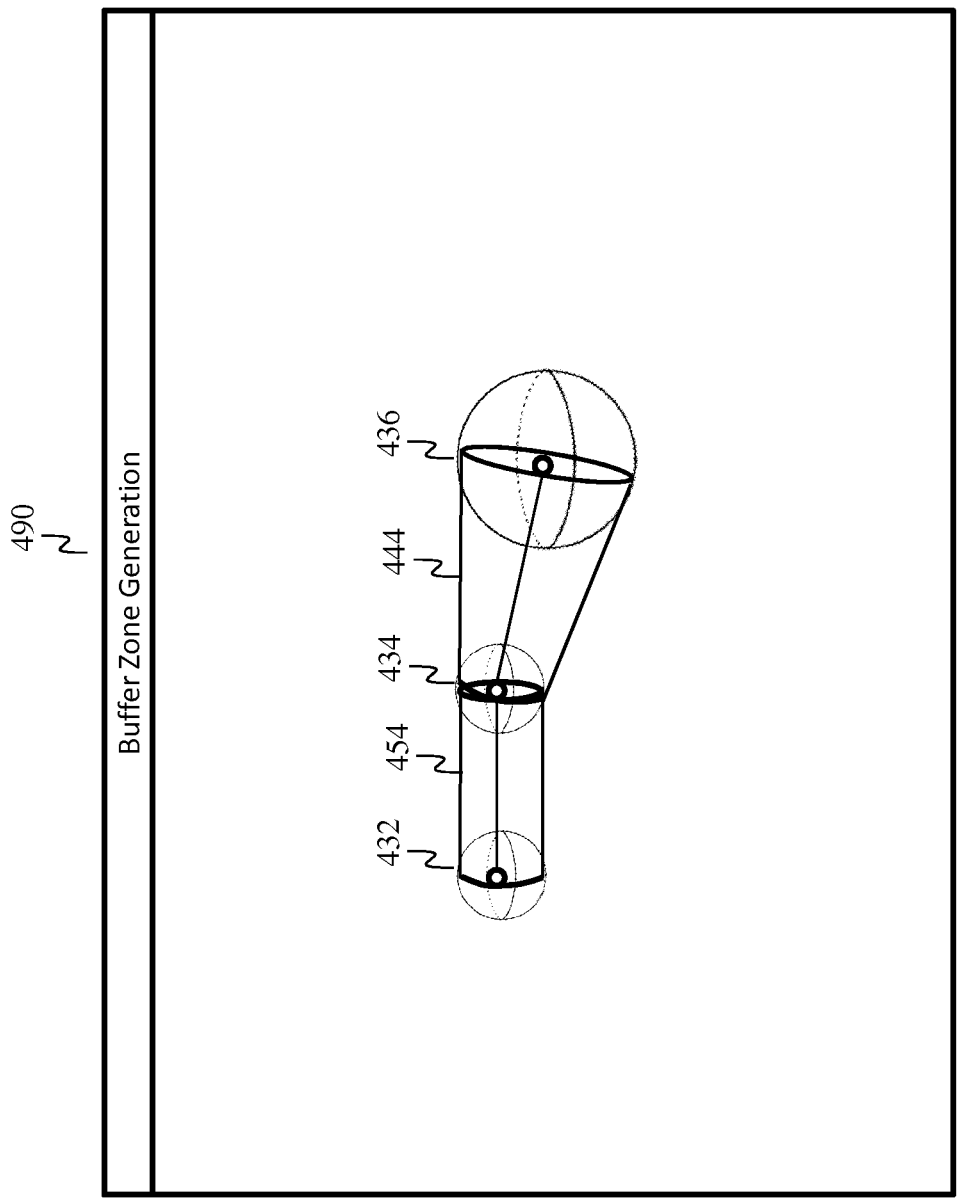
FIG. 4F is another illustration of a graphical user interface that shows buried asset data points surrounded by spheres and truncated cones, according to an example embodiment.

FIGS. 4D through 4F depict illustrations of graphical user interfaces (GUI) that show how a three-dimensional buffer zone is generated using buried asset data points, according to an example embodiment. In FIG. 4D, the GUI 470 shows that the three buried asset data points 402, 404, 406 are connected via straight line segments to form a central line 420 that represents an approximation of the location of the buried asset in between the buried asset data points 402, 404, 406. GUI 470 of FIG. 4D shows that a three-dimensional sphere (also referred to as a solid) has been created around the geographical coordinate of each buried asset data point, namely, spheres 432, 434 and 436. The size of each sphere corresponds to the precision data value corresponding to the geographical coordinate of the buried asset data point. In one embodiment, the sphere generated around each buried asset data point is generated as follows: 1) read the precision data value of the geographical coordinate of the buried asset data point, 2) generate a radius value that corresponds to the precision data value (such as by multiplying the precision data value by a constant that represents the desired size of the buffer), 3) create a sphere around the buried asset data point using the radius value as the radius measurement of the sphere.

GUI 480 of FIG. 4E further shows that the adjacent buried asset data points 404, 406 (and, by extension, the spheres 434, 436) have been connected via a three-dimensional truncated cone 444 (also referred to as a solid). A truncated cone comprises a three dimensional cone shape wherein a top of the cone (normally pointed) is cut or sliced off such that the top surface of the cone is a flat surface that is parallel to the bottom flat surface. For illustration purposes, the truncated cone 444 is shown without an occluded view as truncated cone 446 in dotted lines. The definition of a truncated cone shape may include a standard cylindrical shape.

In one embodiment, the truncated cone 444 that connects adjacent buried asset data points has a first side (also referred to as the bottom flat surface above) comprising a circle that bisects the first sphere 436, and a second side (also referred to as the top flat surface above) comprising a circle that bisects the second sphere 434. To bisect a sphere refers to generating a flat surface that extends through a sphere such that the surface includes the center of the sphere, thereby dividing the sphere in two equal halves. In one alternative, the first side of the truncated cone 444 is parallel to the second side, and the first and second sides are both perpendicular to a straight line between buried asset data points 404, 406. In another alternative, the first side of the truncated cone 444 is bound by the sphere 436 and the second side of the truncated cone 444 is bound by sphere 434. A circle is bound by a sphere if the entire circle is located within the sphere.

In one embodiment, the truncated cone 444 that connects adjacent buried asset data points 404, 406 may be generated as follows: 1) generate a straight line between adjacent buried asset data points 404, 406, 2) generate a first side of the truncated cone 444 by generating a circle that bisects the first sphere 436, and a second side of the truncated cone 444 by generating a circle that bisects the second sphere 434 (wherein the first and second sides may be parallel, wherein the first and second sides may be parallel to a line connecting points 404, 406, wherein the first side may be bound by sphere 436, and wherein the second side may be bound by sphere 434), and 3) connect the first side of the truncated cone 444 with the second side of the truncated cone 444 with a continuous surface. Specifically, the continuous surface is a substantially cylindrical shape that connects the periphery of the circle that bisects sphere 436 with the periphery of the circle that bisects sphere 434.

Subsequently, all adjacent buried asset data points are connected via a truncated cone, similarly to truncated cone 444. GUI 490 of FIG. 4F further shows that the adjacent buried asset data points 402, 404 (and, by extension, the spheres 432, 434) have been connected via a truncated cone 454. The three-dimensional buffer zone comprises the union of all spheres and truncated cones generated in GUIs 470-490 above.

Figure 5A:
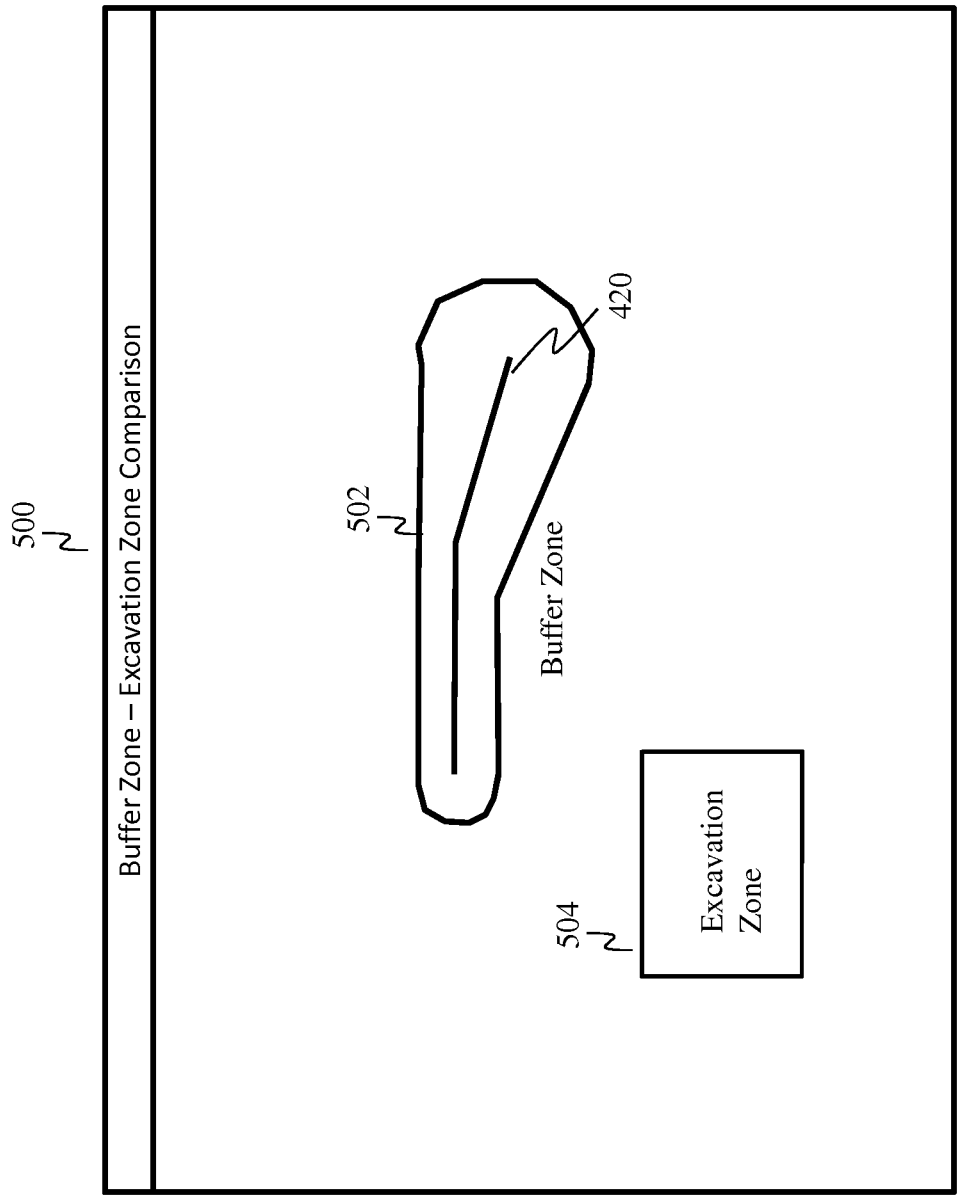
FIG. 5A is an illustration of a graphical user interface that shows a buffer zone defined around buried asset data points and a proposed excavation zone, according to an example embodiment.

FIG. 5A is an illustration of a GUI 500 that shows a two-dimensional buffer zone 502 defined around buried asset data points and a two-dimensional proposed excavation zone 504, according to an example embodiment. The GUI 500 shows that buffer zone 502 does not intersect with excavation zone 504, and therefore there is no need for a technician 110 to be dispatched to perform a locate procedure at the location of excavation zone 504.

Figure 5B:
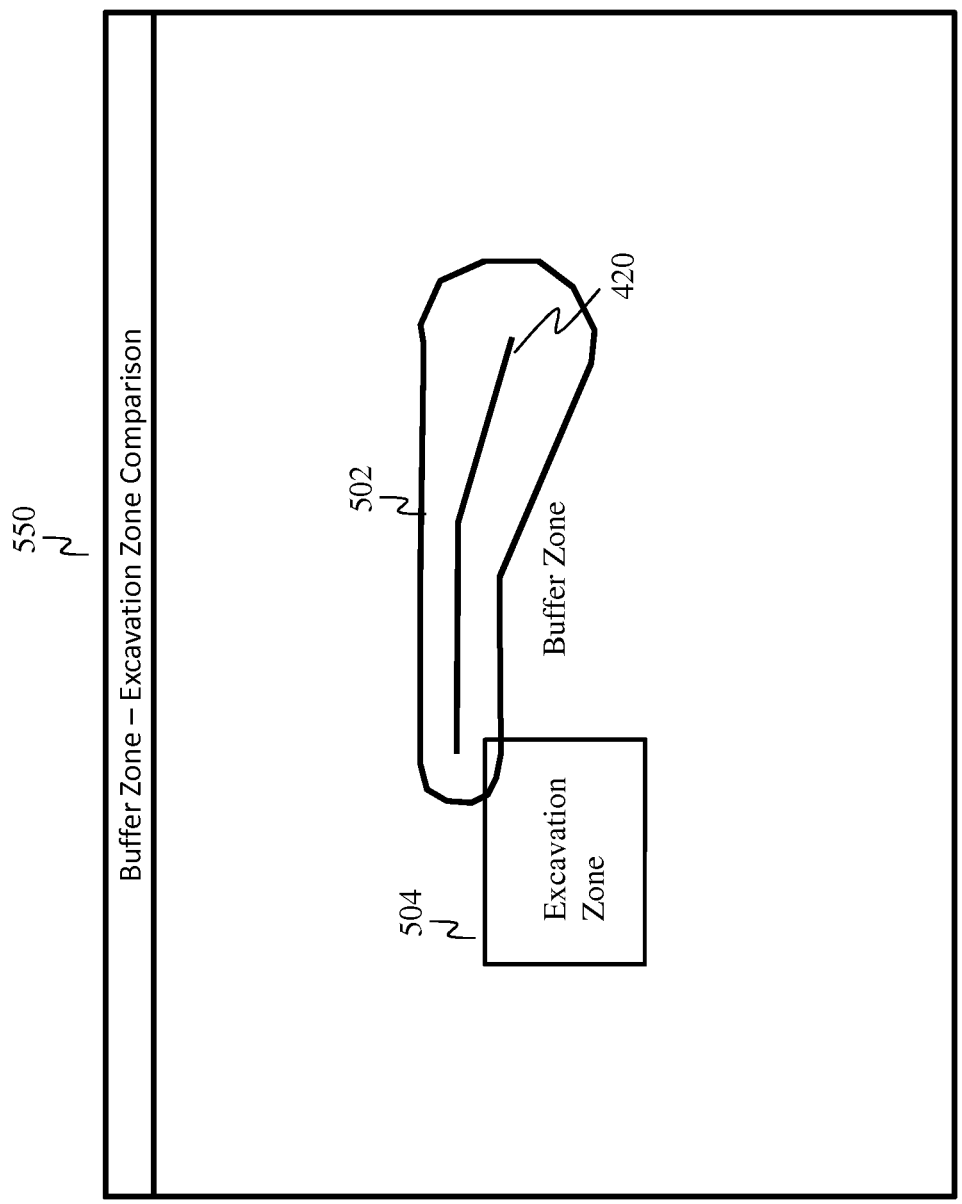
FIG. 5B is an illustration of a graphical user interface that shows a buffer zone defined around buried asset data points, wherein the buffer zone overlaps with a proposed excavation zone, according to an example embodiment.

FIG. 5B is an illustration of another GUI 550 that shows a two-dimensional buffer zone 502 defined around buried asset data points and a two-dimensional proposed excavation zone 504, according to an example embodiment. The GUI 550 shows that buffer zone 502 intersects with excavation zone 504, and therefore there is a need for a technician 110 to be dispatched to perform a locate procedure at the location of excavation zone 504

Figure 6:
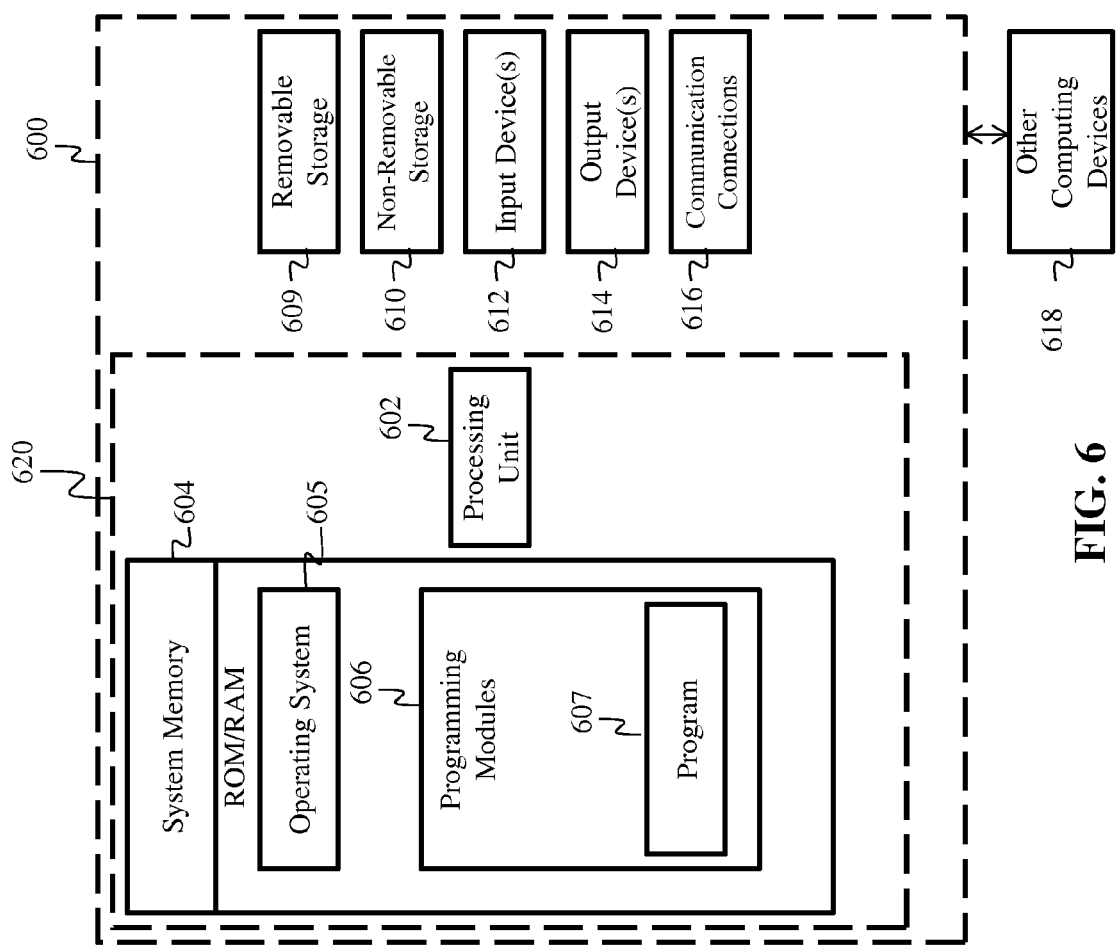
FIG. 6 is a block diagram of a system including a computing device, according to an example embodiment.

FIG. 6 is a block diagram of a system including an example computing device 600 and other computing devices. Consistent with the embodiments described herein, the aforementioned actions performed by server 102, device 120, and antenna array 112 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and process 300, as described above. Process 300 may operate in other environments and are not limited to computing device 600.

With reference to FIG. 6, a system consistent with an embodiment of the invention may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of server 102, and device 120. Furthermore, embodiments of the invention may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the process 900 as described above. The aforementioned processes are examples, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method on a computing device for defining a buffer zone around a buried asset at an above-surface location, the method comprising:
    receiving and storing, by a processor on the computing device, a plurality of buried asset data points, wherein each buried asset data point comprises a geographical coordinate and a precision data value corresponding to the geographical coordinate, for a buried asset, wherein the plurality of buried asset data points correspond to analog radio frequency signals that were detected and read from the buried asset at the above-surface location; and
    generating, by the processor, a first data structure that represents a two dimensional area comprising a buffer zone at the above-surface location, wherein the first data structure is generated by:
    (a) defining, by the processor, a first circle around a geographical coordinate of a buried asset data point and a second circle around a geographical coordinate of an adjacent buried asset data point of the plurality of buried asset data points, and wherein a size of each circle is based on the precision data value of the corresponding buried asset data point;
    (b) defining, by the processor, a trapezoid, wherein a first side of the trapezoid is a line that bisects the first circle and wherein a second side of the trapezoid is a line that bisects the second circle; and
    (c) repeating, by the processor, steps (a) and (b) for each adjacent pair of buried asset data points, and wherein a combination of the circles and trapezoids generated comprise the two dimensional area of the first data structure.

2. The method of claim 1, further comprising:
    receiving, by the processor, a second data structure that represents a two dimensional area comprising an excavation zone at the above-surface location;
    calculating, by the processor, whether the two dimensional area of the first data structure intersects with the two dimensional area of the second data structure; and
    transmitting, by the processor, a request for a locate procedure to a user via a communications network communicatively coupled with the computing device, if the two dimensional area of the first data structure intersects with the two dimensional area of the second data structure.

3. The method of claim 2, wherein the step (b) of the step of generating the first data structure that represents the two dimensional area, further comprises:
    defining, by the processor, a trapezoid, wherein a first side of the trapezoid is a line that bisects, and is bound by, the first circle, and wherein a second side of the trapezoid is a line that bisects, and is bound by, the second circle.

4. The method of claim 2, wherein the step (b) of the step of generating the first data structure that represents the two dimensional area, further comprises:
    defining, by the processor, a straight line between the geographical coordinate of the first circle and the geographical coordinate of the second circle; and
    defining, by the processor, a trapezoid, wherein a first side of the trapezoid is a line that: i) bisects the first circle, ii) is bound by the first circle, and iii) is perpendicular to the straight line, and wherein a second side of the trapezoid is a line that: i) bisects the second circle, ii) is bound by the second circle, and iii) is perpendicular to the straight line.

5. The method of claim 4, wherein the step (b) of the step of generating the first data structure that represents the two dimensional area, further comprises:
    defining, by the processor, a trapezoid, wherein a third side of the trapezoid is a line that connects one end of the first side with one end of the second side, and wherein the fourth side of the trapezoid is a line that connects another end of the first side with another end of the second side.

6. The method of claim 2, wherein the step of receiving and storing a plurality of buried asset data points further comprises:
    receiving, by the processor, from a mobile computing device via the communications network, the plurality of buried asset data points.

7. The method of claim 6, wherein the step of receiving and storing a plurality of buried asset data points further comprises:
    receiving, by the processor, the plurality of buried asset data points, wherein each buried asset data point further comprises a precision data value corresponding to a depth measurement of the buried asset data point.

8. A method on a server for defining a buffer zone around a buried asset, the server communicatively coupled with a communications network, the method comprising:
    generating a first data structure that represents a three dimensional solid comprising a buffer zone, wherein the first data structure is generated by defining a three dimensional solid around the geographical coordinates of the plurality of buried asset data points, wherein a size of the three dimensional solid is based on the precision data values of the plurality of buried asset data points;

receiving and storing, by a processor on the computing device, a plurality of buried asset data points, wherein each buried asset data point comprises a depth measurement data, a geographical coordinate and a precision data value corresponding to the geographical coordinate, for a buried asset, wherein the plurality of buried asset data points correspond to analog radio frequency signals that were detected and read from the buried asset at the above-surface location; and generating, by the processor, a first data structure that represents a three dimensional solid comprising a buffer zone, wherein the first data structure is generated by:

(a) defining, by the processor, a first sphere around a geographical coordinate of a buried asset data point and a second sphere around a geographical coordinate of an adjacent buried asset data point of the plurality of buried asset data points, and wherein a size of each sphere is based on the precision data value of the corresponding buried asset data point;

(b) defining, by the processor, a truncated cone, wherein a first side of the truncated zone is a circle that bisects the first sphere and wherein a second side of the truncated zone is a circle that bisects the second sphere; and (c) repeating, by the processor, steps (a) and (b) for each adjacent pair of buried asset data points, and wherein a combination of the spheres and truncated cones generated comprise the three dimensional solid of the first data structure.

9. The method of claim 8, further comprising:

receiving, by the processor, a second data structure that represents a two dimensional surface comprising an excavation zone;

calculating, by the processor, whether the three dimensional solid of the first data structure intersects with the two dimensional surface of the second data structure; and transmitting, by the processor, a request for a locate procedure to a user via the communications network, if the three dimensional solid of the first data structure intersects with the two dimensional surface of the second data structure.

10. The method of claim 9, wherein the step (b) of the step of generating the first data structure that represents the three dimensional solid, further comprises:

defining, by the processor, a truncated cone, wherein a first side of the truncated cone is a circle that bisects, and is bound by, the first sphere, and wherein a second side of the truncated cone is a circle that bisects, and is bound by, the second sphere.

11. The method of claim 9, wherein the step (b) of the step of generating the first data structure that represents the three dimensional solid, further comprises:

defining, by the processor, a straight line between the geographical coordinate of the first sphere and the geographical coordinate of the second sphere; and defining, by the processor, a truncated cone, wherein a first side of the truncated cone is a circle that: i) bisects the first sphere, ii) is bound by the first sphere, and iii) is perpendicular to the straight line, and wherein a second side of the truncated cone is a line that: i) bisects the second sphere, ii) is bound by the second sphere, and iii) is perpendicular to the straight line.

12. The method of claim 11, wherein the step (b) of the step of generating the first data structure that represents the three dimensional solid, further comprises:

defining, by the processor, a truncated cone, wherein a main body of the truncated cone connects the first side of the truncated cone with the second side of the truncated cone.

13. The method of claim 9, wherein the step of receiving and storing a plurality of buried asset data points further comprises:

receiving, by the processor, from a mobile computing device via the communications network, the plurality of buried asset data points.

14. The method of claim 13, wherein the step of receiving and storing a plurality of buried asset data points further comprises:

receiving, by the processor, the plurality of buried asset data points, wherein each buried asset data point further comprises a precision data value corresponding to a depth measurement of the buried asset data point.

15. A method on a computing device for defining a buffer zone around a buried asset at an above-surface location, the method comprising:

receiving and storing, by a processor on the computing device, a plurality of buried asset data points, wherein each buried asset data point comprises depth measurement data, electrical current measurement data, a geographical coordinate and a precision data value corresponding to the geographical coordinate, for a buried asset, wherein the plurality of buried asset data points correspond to analog radio frequency signals that were detected and read from the buried asset at the above-surface location; and generating, by the processor, a first data structure that represents a two dimensional area comprising a buffer zone at the above-surface location, wherein the first data structure is generated by:

(a) defining, by the processor, a first circle around a geographical coordinate of a buried asset data point and a second circle around a geographical coordinate of an adjacent buried asset data point of the plurality of buried asset data points, and wherein a size of each circle is based on the precision data value of the corresponding buried asset data point;

(b) defining, by the processor, a trapezoid, wherein a first side of the trapezoid is a line that bisects the first circle and wherein a second side of the trapezoid is a line that bisects the second circle; and (c) repeating, by the processor, steps (a) and (b) for each adjacent pair of buried asset data points, and wherein a combination of the circles and trapezoids generated comprise the two dimensional area of the first data structure.

16. The method of claim 15, further comprising:

receiving, by the processor, a second data structure that represents a two dimensional area comprising an excavation zone at the above-surface location;

calculating, by the processor, whether the two dimensional area of the first data structure intersects with the two dimensional area of the second data structure; and transmitting, by the processor, a request for a locate procedure to a user via a communications network communicatively coupled with the computing device, if the two dimensional area of the first data structure intersects with the two dimensional area of the second data structure.

17. The method of claim 16, wherein the step (b) of the step of generating the first data structure that represents the two dimensional area, further comprises:
    defining, by the processor, a trapezoid, wherein a first side of the trapezoid is a line that bisects, and is bound by, the first circle, and wherein a second side of the trapezoid is a line that bisects, and is bound by, the second circle.

18. The method of claim 16, wherein the step (b) of the step of generating the first data structure that represents the two dimensional area, further comprises:
    defining, by the processor, a straight line between the geographical coordinate of the first circle and the geographical coordinate of the second circle; and
    defining, by the processor, a trapezoid, wherein a first side of the trapezoid is a line that: i) bisects the first circle, ii) is bound by the first circle, and iii) is perpendicular to the straight line, and wherein a second side of the trapezoid is a line that: i) bisects the second circle, ii) is bound by the second circle, and iii) is perpendicular to the straight line.

19. The method of claim 18, wherein the step (b) of the step of generating the first data structure that represents the two dimensional area, further comprises:
    defining, by the processor, a trapezoid, wherein a third side of the trapezoid is a line that connects one end of the first side with one end of the second side, and wherein the fourth side of the trapezoid is a line that connects another end of the first side with another end of the second side.

\* \* \* \* \*